United States Patent

Huynh

[11] Patent Number: 5,279,452
[45] Date of Patent: Jan. 18, 1994

[54] DRINK HOLDER

[76] Inventor: Nichol Huynh, 505 Harr Dr. #G, Mid West City, Okla. 73110

[21] Appl. No.: 74,352

[22] Filed: Jun. 10, 1993

Related U.S. Application Data

[63] Continuation-in-part of Ser. No. 886,148, May 21, 1992, abandoned.

[51] Int. Cl.[5] .................................................. B60R 7/04
[52] U.S. Cl. ............................. 224/42.45 R; 224/901; 224/42.46 R; 108/46; 248/215; 248/311.2; 248/314; 220/737; 220/739; 220/903
[58] Field of Search .................. 224/273, 312, 42.42, 224/42.45 R, 42.46 R, 901; 220/400, 401, 737, 739, 903; 229/89; 248/215, 205.2, 311.2, 312, 312.1, 313, 314; 211/75, 87-89; 108/44-46

[56] References Cited

U.S. PATENT DOCUMENTS

| | | | |
|---|---|---|---|
| 4,697,780 | 10/1987 | Wenkman et al. | 248/311.2 X |
| 4,915,337 | 4/1990 | Iwasaki | 248/311.2 |
| 4,928,873 | 5/1990 | Johnson | 220/739 X |
| 5,147,067 | 9/1992 | Effertz | 220/739 |
| 5,169,025 | 12/1992 | Guo | 220/739 |
| 5,219,140 | 6/1993 | Spykerman | 248/311.2 |

FOREIGN PATENT DOCUMENTS 9108126  6/1991  PCT Int'l Appl. .......... 224/42.45 R Primary Examiner—J. Casimer Jacyna

[57] ABSTRACT

A drink holder consists of a holder and a rectangular insulation blanket. The holder has a tab fitting between a window glass and an automobile's inner door panel, a connector joining the tab and a hook mating with its counterpart on the insulation blanket. On the upper longer side of the insulation blanket, there is a ring structure with a cross section of a hook corresponding to the hook of the holder. A flexible hook and loop band encloses the shorter sides of the insulation blanket allowing it to accommodates drink containers with different diameters. The insulation blanket also has a stopper located on its inner side wall preventing the drink container from sliding through.

2 Claims, 3 Drawing Sheets

DRINK HOLDER

CROSS-REFERENCE TO RELATED APPLICATION

This application is a continuation-in-part of an application filed by me in the United States Patent and Trademark Office on May 21, 1992, Ser. No. 07/886,148, entitled "Drink Holder", and now abandoned.

BACKGROUND OF THE INVENTION

1. Field of the Invention

This invention relates to a drink holder to be used in an automobile. This invention can be used on any automobile while the user conveniently carries the drink container with him. The holding device is completely detachable from the car and has no adhesive means.

2. Description of the Prior Art

Many patents concerning drink holders in an automobile require adhesive means to attach the drink holder to the car or the device does not fit on all cars. All of the prior arts that the examiner allowed me to review concerning my application Ser. No. 07/886,148 and 08/074,352 required some degree of attention from the user to align the drink container with its receptacle. This invention provides an insulation blanket and allows the user to attach and detach the drink container from its holder with minimal attention.

SUMMARY OF THE INVENTION

The drink holder mounting on an automobile door includes an "S" shaped holder and an insulation blanket. The holder comprises a tab which is adapted for frictional fitting between a window glass and an inner door panel of the automobile, a first hook and a connector for joining the tab and the hook. The connector is adapted to circumscribe an inner door panel of the car. As a variation of the connector of the holder, it is short enough to fit over an unfolded car's sun visor.

The insulation blanket is a rectangular thermo insulating sheet with a first and a second short side and two longer sides connecting the first and second short sides. The insulation blanket comprises a second hook which corresponds with and releasably attaches to the first hook of the holder. The second hook projecting from an edge of one of the longer sides of the rectangular sheet and extending along the same side of the sheet from the first adjacent short side to the second adjacent short side. And a flexible hook and loop band which connects the first and second short sides of the rectangular insulation blanket whereby the insulation blanket is adapted to adjustably encircle and support a drink container in an upright position. The drink container is a glass, a cup, a bottle, or a soft drink can. Because the second hook of the insulation blanket is larger than the first hook of the holder, it requires little effort to engage the insulation blanket to the holder. The insulation blanket also has a stopper located on its inner side wall along the longer side opposite to the second hook of the insulation blanket for preventing the drink container from sliding through.

DESCRIPTION OF THE PREFERRED EMBODIMENTS

Figure 1:
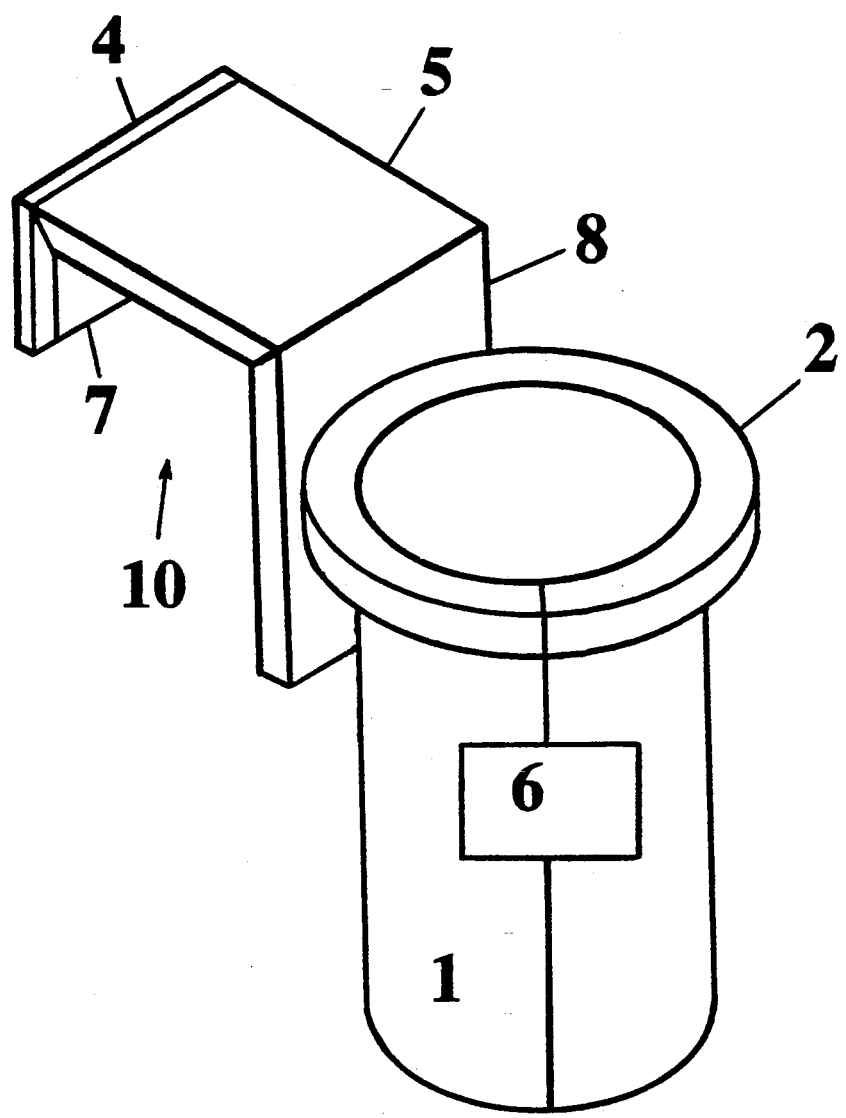
FIG. 1 is an isometrical view of the drink holder in operative position. The insulation jacket 1 with the flexible hook and loop band 6 encircles a soft drink can or a glass (not shown). The tab 7 with the anti-galling surface 4 fits between the window glass and the inner panel of the car door.

Like characters Of reference designate like parts in those figures of the drawings in which they occur.

In the drawings:

Referring first to FIG. 1, the reference numeral 1 shows an insulation blanket having a ring structure 2 with a cross section of an inverted "U" at its upper longer side and a flexible hook and loop band 6 connecting its shorter sides. The flexible hook and loop band 6 enables the insulation blanket 1 to accommodate drink containers with different diameters. The holder 10 has the connector 5 joining the hook 8 and the tab 7 while the anti-galling surface 4 protects the car windows glass from being accidentally scratched.

Figure 2:
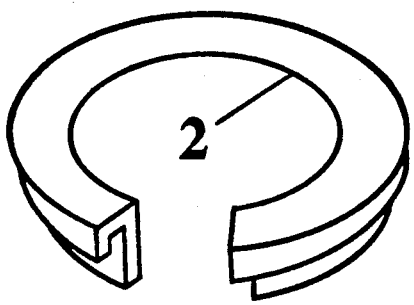
FIG. 2 is an isometrical view of the inverted "U" shaped cross section ring hook 2 for mating with the "U" shaped hook 9 of the holder 10.

FIG. 2 shows the ring hook 2 with the inverted "U" shaped cross section.

Figure 3:
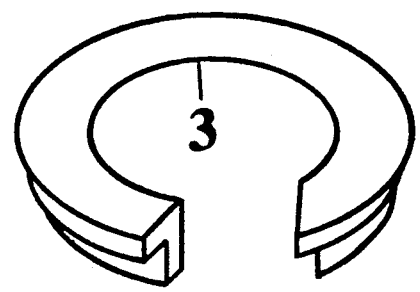
FIG. 3 is an isometrical view the ring hook 3 with an inverted "V" shaped cross section for mating with the "V" shaped hook 8 of the holder 10.

FIG. 3 shows the ring hook 3 with the inverted "V" shaped cross section.

Figure 4:
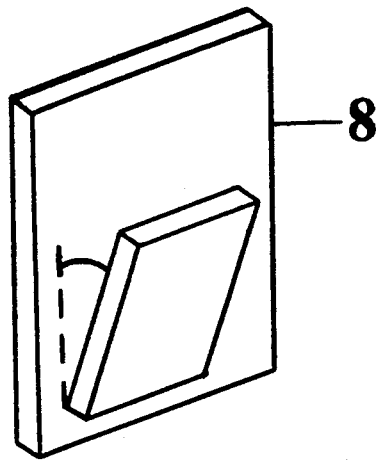
FIG. 4 is an isometrical view of the "V" shaped hook 8.

FIG. 4 shows the "V" shaped hook 8 of the holder 10.

Figure 5:
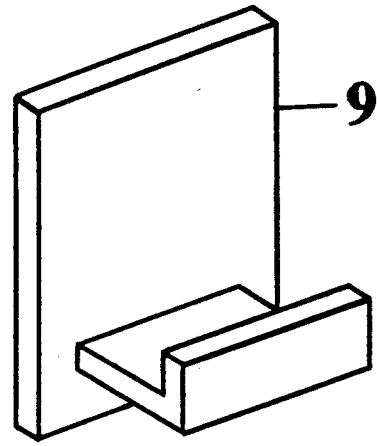
FIG. 5 is an isometrical view of the "U" shaped hook 9.

FIG. 5 shows the "U" shaped hook 9 of the holder 10. As a variation, either the hook 8 in FIG. 4 or the hook 9 in FIG. 5 is bonded directly to the interior of the car for holding the insulation jacket 1 in place.

Figure 6:
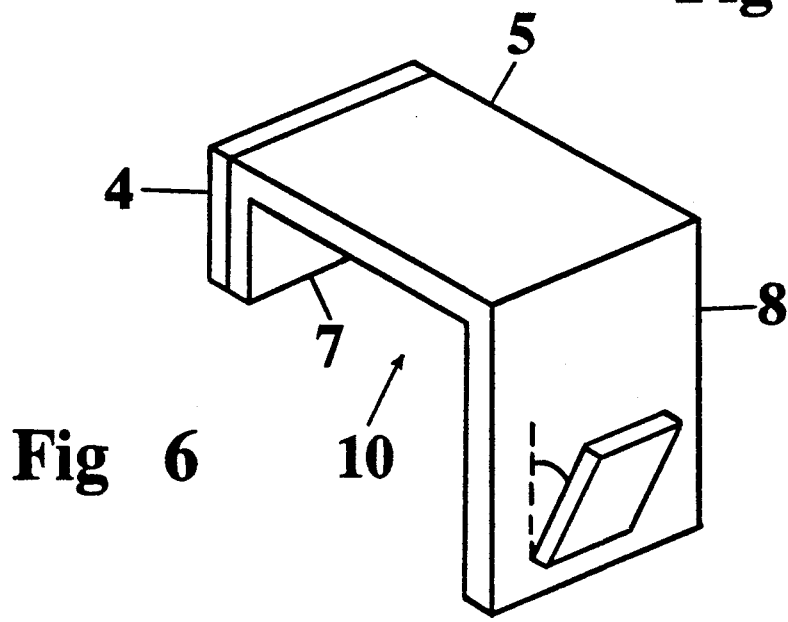
FIG. 6 is a view of the holder 10 with the connector 5, the hook 8 and the anti-galling surface 4 on the tab 7.

FIG. 6 shows the holder 10 having the connector 5 joining the tab 7 with the anti galling surface 4 and the hook 8.

Figure 7:
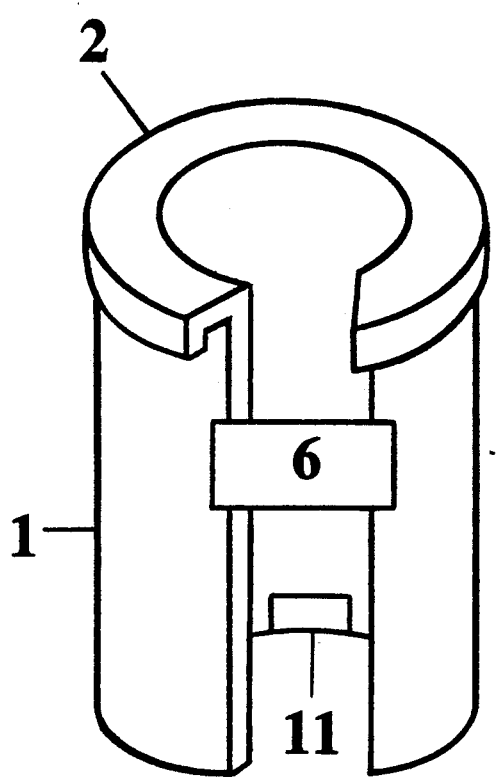
FIG. 7 is a view of the insulation blanket 1 with the inverted "U" shaped cross section ring hook 2, the stopper 11, and the flexible hook and loop band 6.
Figure 8:
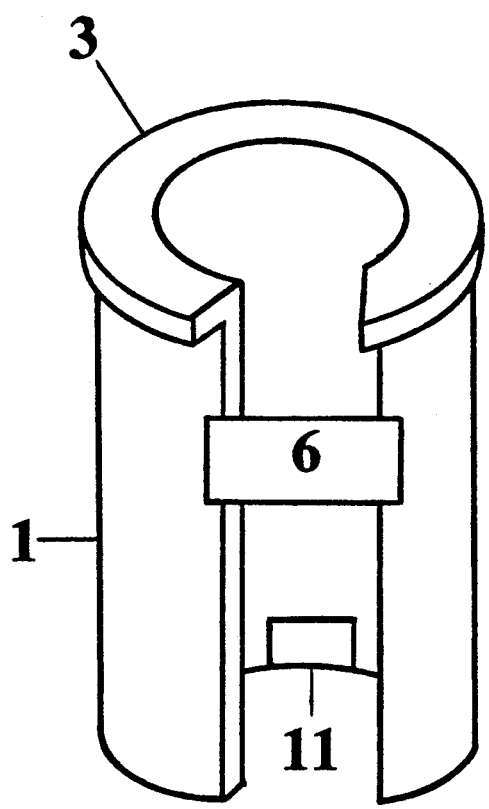
FIG. 8 is a view of the insulation blanket 1 with the inverted "V" shaped cross section ring hook 3, the stopper 11, and the flexible hook and loop band 6.

FIG. 7 and FIG. 8 show the insulation blankets 1 with the inverted "U" and "V" shaped ring structures, respectively. The flexible hook and loop band 6 encircles the drink container, and the stopper 11 prevents the drink container from sliding through the insulation blanket.

Obviously the invention is susceptible to changes or alterations without defeating its practicability. Therefore, I do not wish to be confined to the preferred embodiment shown in the drawings and described herein.

I claim:

1. An automobile drink holder comprising an "S" shaped holder and a rectangular insulation blanket;

said holder having a tab which is adapted for frictional fitting between a window glass and an inner door panel of said automobile, a first hook and a connector for joining the tab and the hook, which connector is adapted to circumscribe an inner panel of a door of said automobile;

said insulation blanket being a rectangle with a first and a second short side and two longer sides connecting the first and second short sides, said insulation blanket having a second hook which corresponds with and releasably attaches to said first hook of said holder, said second hook projecting from an edge of one of the longer sides of said rectangle and extending along said longer side of said rectangle from adjacent said first short side to adjacent said second short side; and a hook and loop band which connects the first and second short sides of said rectangular insulation blanket whereby said insulation blanket is adapted to adjustably encircle and support a drink container in an upright position.

2. An automobile drink holder as claimed in claim 1 further comprising a stopper is located on the inner side wall along said longer side opposite from said second hook of said insulation blanket; and is adapted for frictional contacting said drink container.

* * * * *